United States Patent [19]

Eppley

[11] 4,290,060
[45] Sep. 15, 1981

[54] BRAKE FUSE WARNING CIRCUIT

[75] Inventor: Dewey W. Eppley, Nappanee, Ind.

[73] Assignee: The Bendix Corporation, Southfield, Mich.

[21] Appl. No.: 83,441

[22] Filed: Oct. 10, 1979

[51] Int. Cl.³ ............................................. B60T 17/22
[52] U.S. Cl. .................................. 340/638; 340/52 B; 188/1.11
[58] Field of Search .................... 340/52 B, 52 C, 638; 188/1 A

[56] References Cited

U.S. PATENT DOCUMENTS 3,828,308  8/1974  Kobayashi ........................ 340/52 C
4,025,781  5/1977  Brearley ........................... 340/52 C Primary Examiner—Alvin H. Waring
Attorney, Agent, or Firm—Ken C. Decker; William A. Marvin

[57] ABSTRACT

A warning circuit generates warning signals in response to a blown fuse in a vehicle brake system which includes primary and ignition-switch controlled. The back-up pump is driven by an electric motor. Control circuitry monitors and controls the brake system and the fuse protects the control circuitry from ground fault conditions. The warning circuit includes a warning lamp which is connected to the battery via the ignition switch and which is grounded through a transistor switch. The transistor switch is resistively coupled to ground and to the vehicle battery through the fuse so that the transistor switch becomes conducting to actuate the lamp upon the blowing of the fuse. Alternatively, a similar transistor switch may be connected to the output of an astable multivibrator, which in turn is connected to the battery via the fuse and whose output is inhibited unless the fuse blows while the ignition switch is closed.

10 Claims, 2 Drawing Figures

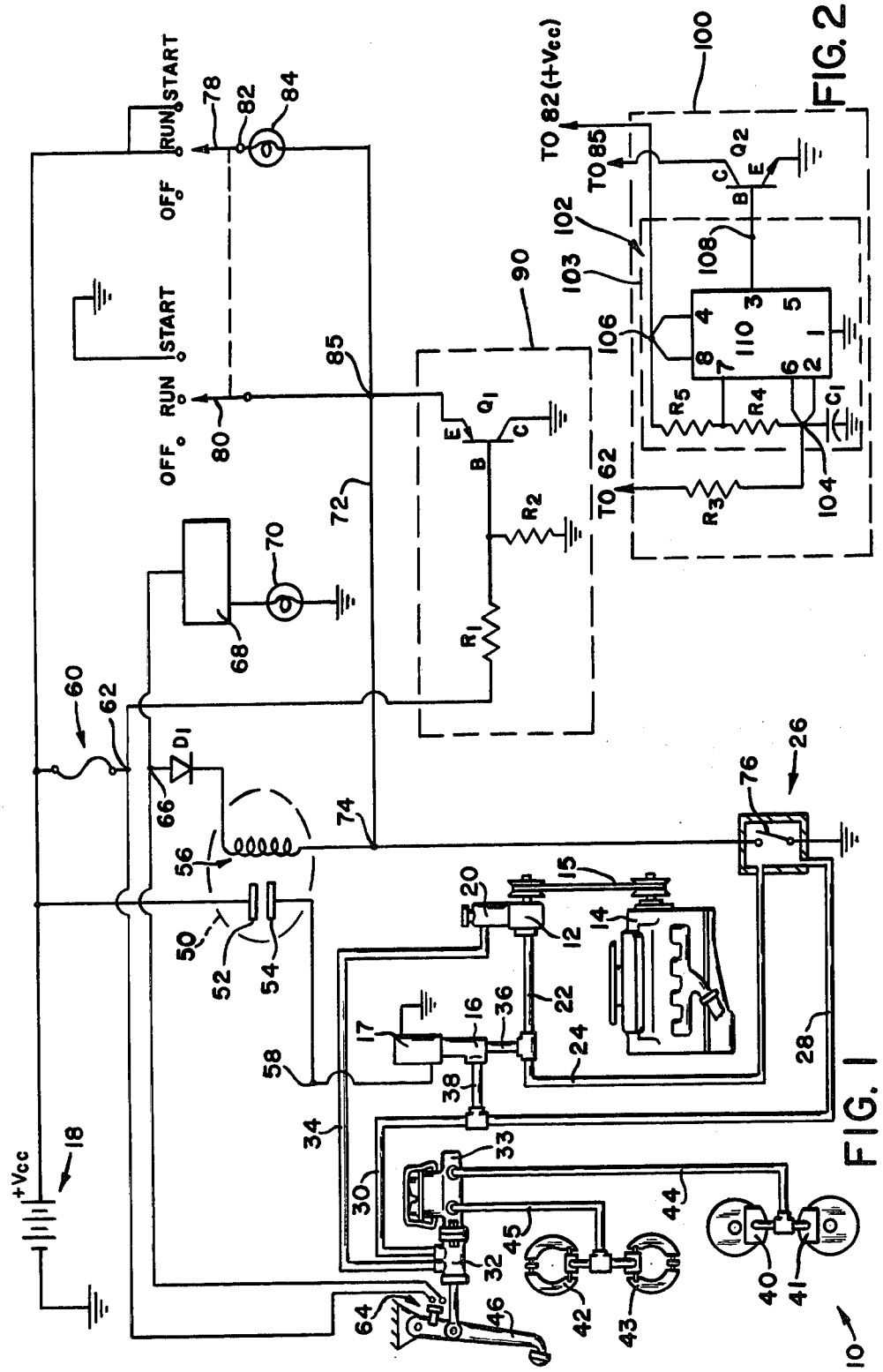

4,290,060

BRAKE FUSE WARNING CIRCUIT

BACKGROUND OF THE INVENTION

This invention relates to a fuse warning circuit which generates a warning signal in response to a blown fuse condition in a brake system which includes fuse-protected electrical circuitry.

In vehicles equipped with hydraulically boosted power brakes, a back-up source of hydraulic pressure is necessary to provide braking upon failure of the primary pressure source. The back-up source may consist of an electric motor-driven pump powered by the vehicle battery as disclosed in copending application Ser. Nos. 83,443 and 83,440 owned by the assignee of this application. The electrical circuitry which controls the operation of the back-up may be protected from short circuit conditions by a fuse connected between the control circuitry and the vehicle battery. The above-mentioned applications disclose circuitry which generates warning signals in response to a failed condition of the associated brake system. However, these circuits do not provide any indication of the blowing of the fuse which protects the control circuitry.

SUMMARY OF THE INVENTION

An advantage of this invention is that it provides a warning signal in response to the failure of a fuse protecting an electric motor-driven brake fluid pressure pump.

Another advantage of this invention is that it provides either a continuous or intermittent warning signal.

These advantages are achieved by the present invention in that it provides means for actuating a warning lamp in response to a blown brake fuse condition while the vehicle ignition switch is "on". The brake system includes an engine-driven primary source of brake fluid pressure and a reserve source driven by a battery-powered motor. Electronic control circuitry monitors and controls the operation of the brake system. A fuse couples the control circuitry with the vehicle battery. The warning lamp includes a first terminal connected to the battery through the ignition switch and a second terminal connected to ground through a controlled switch. The controlled switch includes a control terminal coupled to the vehicle battery via the fuse. The controlled switch becomes conducting to continuously illuminate the warning lamp when the fuse is blown. A flashing lamp display is achieved by connecting an astable multivibrator between the fuse and the control terminal of the controlled switch.

BRIEF DESCRIPTION OF THE DRAWINGS

FIG. 1 of the Drawing is a schematic diagram of a vehicle brake system including an embodiment of applicant's fuse failure warning circuit; and FIG. 2 of the Drawing is a schematic diagram of an alternate embodiment of applicant's fuse failure warning circuit.

DETAILED DESCRIPTION

A vehicle brake system 10 includes a main hydraulic power steering fluid pump 12 powered by the engine 14 via belt 15 and an auxiliary or back-up brake fluid pump 16 driven by an electric motor 17 powered by the vehicle battery 18. Power steering pump 12 pumps hydraulic fluid from reservoir 20 through conduits 22 and 24, fluid flow sensor 26, and conduits 28 and 30, to brake booster 32. Fluid returns to reservoir 20 through return conduit 34. Back-up pump 16 pumps fluid from reservoir 20 through pump 12, conduits 22, 36, 38, and 30 to brake booster 32 and back to reservoir 20 through return conduit 34. Master cylinder 33 communicates pressurized brake fluid to wheel assemblies 40, 41, 42, and 43 via conduits 44 and 45 in response to vehicle operator brake applications applied via brake pedal 46.

The motor 17 is connected to the battery 18 via a relay device 50 which includes a pair of contacts 52 and 54 which close in response to currecnt flow through relay coil 56. Contact 52 is connected to the positive terminal of battery 18 and contact 54 is connected to a terminal 58 of grounded motor 17. A brake fuse 60 connects the positive terminal of battery 18 with terminal 62. A brake switch 64 connects terminal 62 with terminal 66 in response to an operator brake application via pedal 46. A conventional flasher unit 68 connects terminal 66 with grounded brake lights 70. Diode D1 includes an anode connected to terminal 66 and a cathode connected to one side of the relay coil 56. The other side of relay coil 56 is connected to a bus 72 at a terminal 74 and terminal 74 is interruptibly connected to ground through fluid flow sensor 26. Flow sensor 26 includes a flow sensitive switch 76 which closes to connect terminal 74 with ground when there is no fluid flow through conduits 24 and 28, such as when the main pump 12 is not operating. Current flows through relay coil 56 to close contacts 52 and 54 when both the brake switch 64 and the sensor switch 76 are closed and when the fuse 60 is intact. Fuse 60 is designed to open the connection between the battery 18 and terminal 62 when a short circuit condition occurs between terminal 62 and ground.

Ignition switch 78 and switch 80 are ganged together as indicated by dashed line 81 in FIG. 1. Ignition switch 78 connects terminal 82 with the positive terminal of battery 18 when the vehicle operator turns the ignition key (not shown) to the "start" or the run positions. A warning device such as lamp 84 is connected between terminal 82 and bus 72 at terminal 85. Switch 80 connects bus 72 with ground when ignition switch 78 is in the "start" position to provide a bulb test for lamp 84.

The embodiment of applicant's warning circuit illustrated in FIG. 1 includes a controlled switching device such as pnp transistor Q1. The emitter terminal E of Q1 is connected to lamp 84 and to bus 72 at terminal 85. The collector terminal C of Q1 is connected to ground. The warning circuit also includes resistors R1 and R2 which connect the base terminal 8 of transistor Q1 with fuse 60 at terminal 62, and with ground, respectively.

MODE OF OPERATION

The circuitry illustrated in FIG. 1 provides a bulb test for lamp 84 when switches 78 and 80 are in the "start" position, as described previously. Also, when the ignition switch 68 is in the "run" position and when main pump 12 is not operating, then sensor switch 76 closes and lamp 84 is actuated by current flow from battery 18 to ground through ignition switch 78, lamp 84, bus 72 and sensor switch 76. When the ignition switch 78 is in the "off" position, no current can flow through lamp 84 and lamp 84 remains deactivated. Diode D1 prevents actuation of flasher unit 68 by current flow from bus 72 to ground through flasher unit 68 and lamp 70 when ignition switch 78 and switch 80 are in the "run" position and when no other path between bus 72 and ground exists, as is the case when transistor Q1 is non-conducting, and when sensor switch 76 is open.

The circumscribed portion 90 of the circuit shown in FIG. 1 provides a warning signal in response to the blowing (open circuit condition) of fuse 60 while the ignition switch 78 is in the "run" position. When fuse 60 is intact, current flows through a voltage divider consisting of resistors R1 and R2, thereby maintaining a relatively high voltage at the base B of transistor Q1. This high base voltage holds transistor Q1 in a non-conducting condition across its emitter and collector terminal E and C. This non-conducting condition prevents current from flowing to ground through lamp 84 and transistor Q1. Thus, as long as fuse 60 is intact and sensor switch 76 is open, lamp 84 will be dark. However, if fuse 60 blows and becomes an open circuit, the current ceases to flow through resistors R1 and R2, thus lowering the voltage at the base B of transistor Q1. This lowered base voltage causes transistor Q1 to become conducting between its emitter terminal E and its collector terminal C. Current then flows to ground through lamp 84 and conducting transistor Q1 so that the warning lamp 84 is continuously illuminated as a result of the failure of fuse 60.

DETAILED DESCRIPTION OF ALTERNATE EMBODIMENT

FIG. 2 illustrates an alternate embodiment of applicant's warning circuit, generally indicated by reference numeral 100, which may be substituted for the circumscribed portion 90 of FIG. 1. Warning circuit 100 includes an astable multivibrator 102 such as is circumscribed by dashed line 103. Astable multivibrator 102 includes an inhibit/enabling input terminal 104 coupled to the battery 18 through resistor R3, terminal 62 and fuse 60. Astable multivibrator 102 also includes a supply voltage terminal 106 which is connected to terminal 82 so that battery voltage +Vcc is communicated to terminal 106 when the ignition switch 78 is in the "run" position. An output terminal 108 of astable multivibrator 102 is coupled to the base B of npn transistor Q2. The emitter E of transistor Q2 is grounded and the collector C is coupled to warning lamp 84 at terminal 85.

Astable multivibrator 102 consists of an available off-the-shelf integrated circuit 110, such as Signetics NE 555T monolithic timing circuit, connected as shown in FIG. 2. More particularly, integrated circuit 110 has an 8-pin configuration with ground pin 1 connected to ground. Input terminal 104 is connected to trigger pin 2, to threshold pin 6, to ground through timing capacitor C1 and to discharge pin 2 through resistor R4. Supply voltage terminal 106 is connected to reset pin 4, to supply voltage pin 8 and to discharge pin 7 through resistor R5. Output pin 3 is connected to output terminal 108. Pin 5 may be disconnected as shown, or it may be coupled to ground through a capacitor (not shown). Connected in this manner, when high voltage is removed from input terminal 104, the integrated circuit 110 causes capacitor C1 to charge up to $\frac{2}{3}$ Vcc through resistors R5 and R4 and to discharge to $\frac{1}{3}$ Vcc through resistor R4 only, thus allowing the integrated circuit 110 to trigger itself and free run as a multivibrator and produce a train of output pulses at terminal 108. The frequency of the output pulse train is independent of the supply voltage Vcc, however, the duty cycle of the output pulse train may be determined by adjusting the resistance values of resistors R4 and R5.

MODE OF OPERATION OF ALTERNATE EMBODIMENT

Warning circuit 100 of FIG. 2 causes lamp 84 to flash on and off in response to the blowing of fuse 60 when the ignition switch 78 in in the "run" position. Before fuse 60 blows, then high voltage is communicated to inhibit/enabling input terminal 104 rough intact fuse 60 and resistor R3. The high voltage at terminal 104 causes multivibrator 102 to maintain a low voltage at output terminal 108 and at base B of transistor Q2. This low base voltage maintains transistor Q2 in a non-conducting condition between its collector and emitter terminals C and E. The non-conducting transistor Q2 prevents current from flowing through lamp 84 and lamp 84 remains dark.

However, fuse 60 may blow as a result of a short circuit condition between ground and terminal 62. The blowing of fuse 60 destroys the connection between battery 18 and terminal 104 via resistor R3 and high voltage is thus no longer maintained at terminal 104. The removal of high voltage from terminal 104 causes astable multi-vibrator 102 to "free run" or produce a train of output pulses at terminal 108 and at the base B of transistor Q2. Transistor Q2 becomes conducting in response to each of the output pulses and thus current flows intermittently from terminal 82 to ground through lamp 84 and conducting transistor Q2. This intermittent current flow causes lamp 84 to flash on and off in response to the blowing of fuse 60.

I claim:

1. A warning circuit for a vehicle brake system having a battery-powered source of brake actuation pressure, having electrical control circuitry for controlling and monitoring the brake system, and having a fuse connected between the battery and the control circuitry for protecting the control circuitry from a short circuit to ground condition, the warning circuit comprising:
   a warning device;
   a controlled switch;
   first means for coupling the controlled switch with the warning device; and
   second means for coupling the controlled switch with the vehicle battery via the fuse, the controlled switch actuating the warning device in response to an open circuit condition of the fuse.

2. The warning circuit of claim 1, wherein:
   the warning device comprises a current actuated device comprising a first terminal which is coupled with the vehicle battery and comprising a second terminal;
   the controlled switch having first and second terminals forming a switch therebetween and means for controlling the switch in response to the potential at a third terminal thereof;
   wherein the first terminal of the controlled switch is connected with the second terminal of the warning device;
   wherein the fuse is connected with the third terminal of the controlled switch; and
   wherein the warning circuit further comprises third coupling means for coupling the second terminal of the controlled switch with ground, the controlled switch permitting current to flow through the warning device and said first and second terminals in response to an open circuit condition of the fuse.

3. The warning circuit of claim 1, wherein:

the controlled switch comprises a transistor with base, emitter and collector terminals; and the warning circuit further comprises third means for coupling the collector with a ground potential, the first coupling means coupling the emitter with the warning device, and the second coupling means coupling the base with the battery via the fuse.

4. The warning circuit of claim 3, wherein the second coupling means comprises:
   a first resistor connected between the fuse and the base; and
   a second resistor connected between the base and the ground potential.

5. The brake system and warning circuit of claim 1, wherein:
   the brake system further comprises an engine-driven source of brake actuation fluid pressure, sensor means for sensing the operation of the primary source, and relay means coupled to the sensor means and to the battery-powered source for energizing the battery-powered source in response to an operator brake application when the engine-driven source is not operating; and
   the warning circuit further comprises means for coupling the warning device with a ground potential through the sensor means so that the warning device may be actuated when the engine is operating during failure of the primary source.

6. A warning circuit for a vehicle brake system having a battery-powered source of brake actuation fluid pressure, having electrical control circuitry for controlling and monitoring the brake system and having a fuse connected between the battery and the control circuitry for protecting the control circuitry from a short circuit to ground condition, the warning circuit comprising:
   warning means for producing a warning signal to be recognized by a vehicle operator;
   a controlled switch device;
   an astable multivibrator device;
   first means for coupling one of the devices with the vehicle battery via the fuse; second means for coupling the other device with the warning means; and
   third means for coupling the devices with each other, the devices cooperating to intermittently actuate the warning means in response to an open circuit condition of the fuse.

7. The warning circuit of claim 6, wherein:
   the astable multivibrator device includes input and output terminals, the first coupling means coupling the input terminal with the fuse, the third coupling means coupling the output terminal with the controlled switch device and the second coupling means coupling the controlled switch device with the warning means, the astable multivibrator device producing a pulse train at the output thereof in response to an open circuit condition of the fuse, the controlled switch intermittently actuating the warning means in response to the pulse train.

8. The warning circuit of claim 7, wherein:
   the controlled switch device comprises a grounded emitter transistor with a base and a collector;
   the second coupling means coupling the collector with the warning means;
   the third coupling means coupling the output of the multivibrator device with the base.

9. The warning circuit of claim 6, wherein:
   the brake system further comprises an engine driven source of brake actuation fluid pressure, sensor means for sensing the operation of the primary source, the sensor means comprising a flow sensitive switch which couples a sensor terminal with ground unless the engine-driven source is operating, and relay means operatively coupled to the sensor means and to the battery-powered source for energizing the battery-powered source in response to an operator brake application when the engine-driven source is not operating; and
   the warning circuit further comprises means for coupling the warning means with the sensor terminal and with the vehicle battery so that the warning means may be actuated when the engine is actuated during failure of the engine-driven source.

10. A warning circuit for a vehicle with a brake system and with an engine started by an ignition switch, the brake system having a battery-powered source of brake actuation fluid pressure, electrical control circuitry for controlling and monitoring the brake system and a fuse connected between the battery and the control circuitry for protecting the control circuitry from a short circuit to ground condition, the warning circuit comprising:
   a current actuated warning device with first and second terminals;
   means for coupling the first terminal with the battery via the ignition switch;
   controlled switch means for coupling the second terminal with ground in response to signals applied to an input of the controlled switch means;
   an astable multivibrator with an input and an output;
   means for coupling the multivibrator output with the input of the output of said controlled switch means; and
   means for coupling the multivibrator input with the battery via the fuse, the multivibrator generating an intermittent signal at the output thereof in response to an open circuit condition of the fuse, the controlled switch means intermittently allowing current to flow through and actuate the warning device in response to the intermittent signals when the ignition switch is closed.

* * * * *